US012709943B2

(12) United States Patent
Guerra

(10) Patent No.: US 12,709,943 B2
(45) Date of Patent: Aug. 18, 2026

(54) CHAIN OPERATION SYSTEM

(71) Applicant: ROLLEASE ACMEDA, INC., Stamford, CT (US)

(72) Inventor: Alirio Guerra, Broadmeadows (AU)

(73) Assignee: ROLLEASE ACMEDA, INC., Stamford, CT (US)

(*) Notice: Subject to any disclaimer, the term of this patent is extended or adjusted under 35 U.S.C. 154(b) by 85 days.

(21) Appl. No.: 18/440,394

(22) Filed: Feb. 13, 2024

(65) Prior Publication Data

US 2024/0271485 A1 Aug. 15, 2024

(30) Foreign Application Priority Data

Feb. 15, 2023 (AU) ................................ 2023900360

(51) Int. Cl.
*E06B 9/326* (2006.01)

(52) U.S. Cl.
CPC .................................... *E06B 9/326* (2013.01)

(58) Field of Classification Search
CPC . E06B 9/326; E06B 9/322; E06B 9/78; E06B 2009/785
See application file for complete search history.

(56) References Cited

U.S. PATENT DOCUMENTS 3,123,182 A 3/1964 Malone et al.
4,932,456 A * 6/1990 Buxbaum ............... E06B 9/324 160/300
8,286,686 B2 * 10/2012 Cannaverde ............ E06B 9/326 160/320
8,544,525 B2 * 10/2013 Zhu ........................... E06B 9/56 160/321
10,208,535 B2 * 2/2019 Marocco ................... E06B 9/78
11,105,149 B2 * 8/2021 Marocco ................... E06B 9/78
11,142,945 B2 * 10/2021 Marocco ................... F16H 7/18
(Continued)

FOREIGN PATENT DOCUMENTS

EP 2458128 A1 5/2012
KR 102559165 B1 7/2023
WO 2023164622 A1 8/2023

OTHER PUBLICATIONS

International-Type Search Report issued from the Australian Patent Office for related National Application No. 2023900360, mailed Dec. 6, 2023; 8 pages.

*Primary Examiner* — Johnnie A. Shablack
(74) *Attorney, Agent, or Firm* — HAYNES AND BOONE, LLP

(57) ABSTRACT

A chain operation system for a chain driven blind assembly that includes a guide member configured to guide a beaded chain loop and comprising first and second channels for guiding first and second sides of the chain loop, respectively. A handle is slidably mounted to the guide member and slides along the longitudinal axis of the guide member in a first direction to engage and drive the chain loop, and in a second direction to release the chain loop. The handle comprises a chain driver selectively rotatable between a first position, whereby the driver drivingly engages one or more beads on the second side of the chain loop, and a second position, whereby the driver drivingly engages one or more beads on the first side of the chain loop. The system also includes a switching member configured to rotate the driver between the first and second positions.

20 Claims, 12 Drawing Sheets

(56) References Cited

U.S. PATENT DOCUMENTS

| | | | | |
|---|---|---|---|---|
| 11,236,547 | B2 * | 2/2022 | Graham | E06B 9/78 |
| 11,913,280 | B2 * | 2/2024 | Lynch | E06B 9/322 |
| 12,338,684 | B2 * | 6/2025 | Lu | E06B 9/42 |
| 12,366,112 | B2 * | 7/2025 | Krantz-Lilienthal | E06B 9/326 |
| 2012/0285635 | A1 | 11/2012 | Zhu | |
| 2015/0007674 | A1 | 1/2015 | Gramsch et al. | |
| 2018/0291680 | A1 | 10/2018 | Marocco | |
| 2019/0169929 | A1 * | 6/2019 | Zhang | E06B 9/60 |
| 2019/0195014 | A1 * | 6/2019 | Chua | E06B 9/326 |
| 2019/0264503 | A1 * | 8/2019 | Marocco | F16H 57/035 |
| 2023/0057794 | A1 * | 2/2023 | Marocco | E06B 9/78 |
| 2023/0228147 | A1 * | 7/2023 | Derk, Jr. | E06B 9/42 160/321 |
| 2023/0407702 | A1 * | 12/2023 | Graham | E06B 9/74 |
| 2024/0003186 | A1 * | 1/2024 | Lu | E06B 9/42 |
| 2024/0209684 | A1 * | 6/2024 | Chauhan | E06B 9/78 |
| 2024/0240520 | A1 * | 7/2024 | Lin | E06B 9/78 |
| 2024/0247541 | A1 * | 7/2024 | Marocco | E06B 9/78 |
| 2024/0247542 | A1 * | 7/2024 | Marocco | E06B 9/326 |
| 2024/0271485 | A1 * | 8/2024 | Guerra | E06B 9/326 |
| 2024/0401405 | A1 * | 12/2024 | Wong | E06B 9/326 |
| 2025/0250852 | A1 * | 8/2025 | Guerra | E06B 9/42 |

* cited by examiner

CHAIN OPERATION SYSTEM

CROSS-REFERENCE TO RELATED APPLICATION

This application claims priority to and the benefit of the filing date of Australian Provisional Patent Application No. 2023900360, titled "Chain operation system" and filed on Feb. 15, 2023, the disclosure of which is hereby incorporated in its entirety herein by reference.

TECHNICAL FIELD

The present disclosure relates to a chain operation system for a chain driven blind assembly. The system may be used to operate the chain loop of a chain driven blind assembly.

BACKGROUND ART

Chain driven blind assemblies include a component that is rotatable to extend and retract a window blind. Such assemblies typically have a drive mechanism that is rotatable about a spindle, and engages a cord, such as a beaded cord or chain. Operation of the cord causes the drive mechanism to rotate about the spindle. For example, the cord may be pulled on one side to rotate the fitting in a first direction to extend the blind, and the cord may be pulled on another side to rotate the fitting in a second direction to retract the blind.

The chain of a chain driven blind assembly forms a loop which hangs from the assembly to facilitate operation of the blind by a user. A problem with a hanging cord loop is that it presents a safety risk, particularly for children. For example, the loop may become entangled around the neck of a child and present a strangulation risk.

A number of retrofit solutions have been proposed to mitigate against this risk. One such solution has been to add a plastic shroud onto the chain. The length of the shroud ensures that a set length of chain (typically 8 inches) is exposed when the shroud is manually lifted by a user. The user manually lifts the shroud to expose the bottom portion of the chain to thereby operate the blind assembly. Such shrouds, have been developed as low-cost retrofit solutions, but are typically limited to 8 inches of exposed chain that is hand pulled during operation to manually lower or raise a blind. This makes the operation of the blind time consuming, awkward and may result in a poor customer experience.

Other retrofit solutions require the synchronized application of hand/finger pressure on a handle to both grab and pull the bead chain to move the blind, i.e. the downstroke. Further, the user also needs to release the bead chain while in the upstroke (no blind motion) to complete a full cycle of operation. This process is repeated several times to take the blind to a desired position. The simultaneous application and release of hand force to operate the blind is cumbersome, inefficient, and can be confusing, resulting in reduced customer acceptance and limited adoption of such child safe products. Current retrofit solutions are also bulky, further reducing customer acceptance and limited adoption of such child safe products.

In this specification, unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein is a chain operation system for a chain driven blind assembly. The system may comprise; a guide member configured to guide a beaded chain loop of the chain driven blind assembly, the guide member extending along a longitudinal axis of the guide member and comprising a first channel for guiding a first side of the chain loop, and a second channel for guiding a second side of the chain loop; and a handle slidably mounted to the guide member, the handle being configured to slide along the longitudinal axis of the guide member in a first direction to engage and drive the chain loop, and in a second direction to release the chain loop, the handle comprising; a chain driver selectively moveable between a first position, whereby the chain driver drivingly engages one or more beads on the second side of the chain loop to extend a blind of the blind assembly, and a second position, whereby the chain driver drivingly engages one or more beads on the first side of the chain loop to retract the blind of the blind assembly; and a switching member operable by a user and configured to move the chain driver between the first and second positions.

In some forms, when the chain driver is configured such that when the chain driver is in the first position, the chain driver disengages the first side of the chain loop to allow the chain driver to pass the first side of the chain loop, and when the chain driver is in the second position, the chain driver disengages the second side of the chain loop to allow the chain driver to pass the second side of the chain loop.

In some forms, the chain driver comprises a body portion and a driver portion extending from the body portion, the body portion extending along a longitudinal axis of the chain driver and comprising a first release side surface offset from the longitudinal axis of the chain driver and forming an acute angle with the longitudinal axis of the chain driver, a second release side surface offset from the longitudinal axis of the chain driver and forming an acute angle with the longitudinal axis of the chain driver, and a nose portion disposed between, and connecting, the first and second release side surfaces.

In some forms, the first and second release side surfaces of the body portion of the chain driver are substantially flat, and the nose portion of the body portion of the chain driver is rounded.

In some forms, when the chain driver is in the first position, the first release side wall of the chain driver extends substantially parallel to the first side of the chain loop to allow the chain driver to disengage the first side of the chain loop when the handle is slid in the first direction, and when the chain driver is in the second position, the second release side wall of the chain driver extends substantially parallel to the second side of the chain loop to allow the chain driver to disengage the second side of the chain loop when the handle is slid in the first direction.

In some forms, the driver portion extends along the longitudinal axis of the chain driver, the driver portion comprising a first engagement side surface offset from the longitudinal axis of the chain driver and forming an acute angle with the longitudinal axis of the chain driver, and a second engagement side surface offset from the longitudinal axis of the chain driver and forming an acute angle with the longitudinal axis of the chain driver.

In some forms, when the chain driver is in the first position, the second engagement side wall of the chain driver extends substantially parallel to the second side of the chain loop to allow the chain driver to engage the second side of the chain loop when the handle is slid in the first direction, and when the chain driver is in the second position, the first engagement side wall of the chain driver extends substantially parallel to the first side of the chain loop to allow the chain driver to engage the first side of the chain loop when the handle is slid in the first direction.

In some forms, the first engagement side wall of the chain driver comprises at least one receiving portion configured to engage and retain the first side of the chain loop, the at least one receiving portion of the first engagement side wall corresponding in profile with a bead of the chain loop.

In some forms, the first engagement side wall of the chain driver comprises first and second locking portions disposed on either side of the at least one receiving portion, the first and second locking portions each being configured to be positioned between adjacent beads of the chain loop.

In some forms, the first engagement side wall of the chain driver comprises two receiving portions, the two receiving portions being configured to engage and retain adjacent beads of the chain loop and In some forms, the second engagement side wall of the chain driver comprises at least one receiving portion configured to engage and retain the second side of the chain loop, the at least one receiving portion of the second engagement side wall corresponding in profile with a bead of the chain loop.

In some forms, the second engagement side wall of the chain driver comprises first and second locking portions disposed on either side of the at least one receiving portion, the first and second locking portions each being configured to be positioned between adjacent beads of the chain loop.

In some forms, the second engagement side wall of the chain driver comprises two receiving portions, the two receiving portion being configured to engage and retain adjacent beads of the chain loop.

In some forms, the body portion and driver portion of the chain driver comprise one or more magnets configured to selectively rotate the chain driver between the first and second positions.

In some forms, when the handle is slid in the second direction, the first and second engagement side surfaces of the chain driver disengage the first and second sides of the chain loop to allow the handle to move freely relative to the chain loop.

In some forms, the chain driver comprises two spaced magnets configured to selectively rotate the chain driver between the first and second positions.

In some forms, the chain driver comprises an aperture formed therethrough and a fastener, the aperture being configured to receive the fastener to mount the chain driver to the handle.

In some forms, the switching member comprises a wheel that is disposed adjacent the chain driver, the wheel comprising one or more magnets configured to selectively rotate the chain driver between the first and second positions upon rotation of the wheel.

In some forms, the wheel comprises an aperture formed therethrough configured to receive the fastener to mount the wheel to the chain driver and the handle.

In some forms, the wheel comprises a first slot disposed on a first side of the wheel, and a second slot disposed on a second side of the wheel, and wherein the handle comprises first and second cover portions, the first cover portion being slidably mounted to the guide, the second cover portion being mounted to the first cover portion, the second cover portion of the handle comprising first and second spaced projections, the first and second spaced projections being configured to be received in the first and second slots of the wheel respectively to limit rotation of the wheel.

In some forms, the first cover portion of the handle comprises a first side wall extending along a first side of the handle and a second side wall extending along a second side of the handle, the first and second side walls being curved in profile to receive first and second side walls of the guide member.

In some forms, the first cover portion of the handle comprises a back wall that connects the first and second side walls of the handle, the back wall being substantially flat in profile.

In some forms, the first cover portion of the handle comprises a front wall that is spaced from the back wall, the front wall being substantially flat in profile and positioned between the first and second side walls of the handle, the first, second, front and back walls of the first cover portion being connected to inhibit rotation of the handle relative to the guide member.

In some forms, the first, second, front and back walls of the first cover portion define a cavity that is configured to receive the guide member.

In some forms, the guide member comprises a first end disposed adjacent the chain driven blind assembly and a second end disposed away from the chain driven blind assembly.

In some forms, when the handle slides in the first direction it moves towards the second end of the guide member, and wherein when the handle slides in the second direction, it moves towards the first end of the guide member.

In some forms, the first and second channels of the guide member are spaced from each other and are C-shaped to correspond with the profile of the beads of the chain loop.

In some forms, the first and second channels each comprise a curved wall that surrounds the respective channel.

In some forms, the curved wall that surrounds the first and second channels is C-shaped to correspond with the profile of the beads of the chain loop and to retain the chain loop in the guide member.

In some forms, an opening in the curved wall that surrounds the first channel faces an opening in the curved wall that surrounds the second channel such that the chain loop is retained within the guide member in use.

Also disclosed herein is a chain operation system for a chain driven blind assembly, the blind assembly comprising a guide member configured to guide a chain loop operably connected to a drive means to retract and extend a blind of the blind assembly. The system may comprise a handle slidably mounted to the guide member, the handle comprising a chain driver mounted to the handle and selectively moveable between a first position, whereby the chain driver engages one or more beads on the first side of the of chain loop to extend the blind assembly, and a second position, whereby the chain driver engages one or more beads on the second side of the chain loop to retract the blind assembly; and a switching member operable by a user and configured to move the chain driver between the first and second positions. The features of the system may be as otherwise described above.

Also disclosed herein is a guide member for a chain driven blind assembly, the guide member being configured to guide a chain loop operably connected to a drive means of the blind assembly. The guide member may comprise; a first wall that surrounds a first channel configured to receive a first side of the chain loop, the first wall defining a first opening; a second wall that surrounds a second channel configured to receive a second side of the chain loop, the second channel being spaced from the first channel, the second wall defining a second opening, the second opening facing the first opening; and a body portion connecting the first wall to the second wall; the first and second walls being configured to retain the chain loop in the first and second channels respectively while allowing the first and second sides of the chain loop to translate within the first and second channels respectively. In some forms, the first and second side walls are curved in profile to correspond with the profile of the beads of the chain loop. The features of the guide member and system may be as otherwise described above.

BRIEF DESCRIPTION OF DRAWINGS

Various embodiments/aspects of the disclosure will now be described with reference to the following figures.

DETAILED DESCRIPTION

Figure 1:
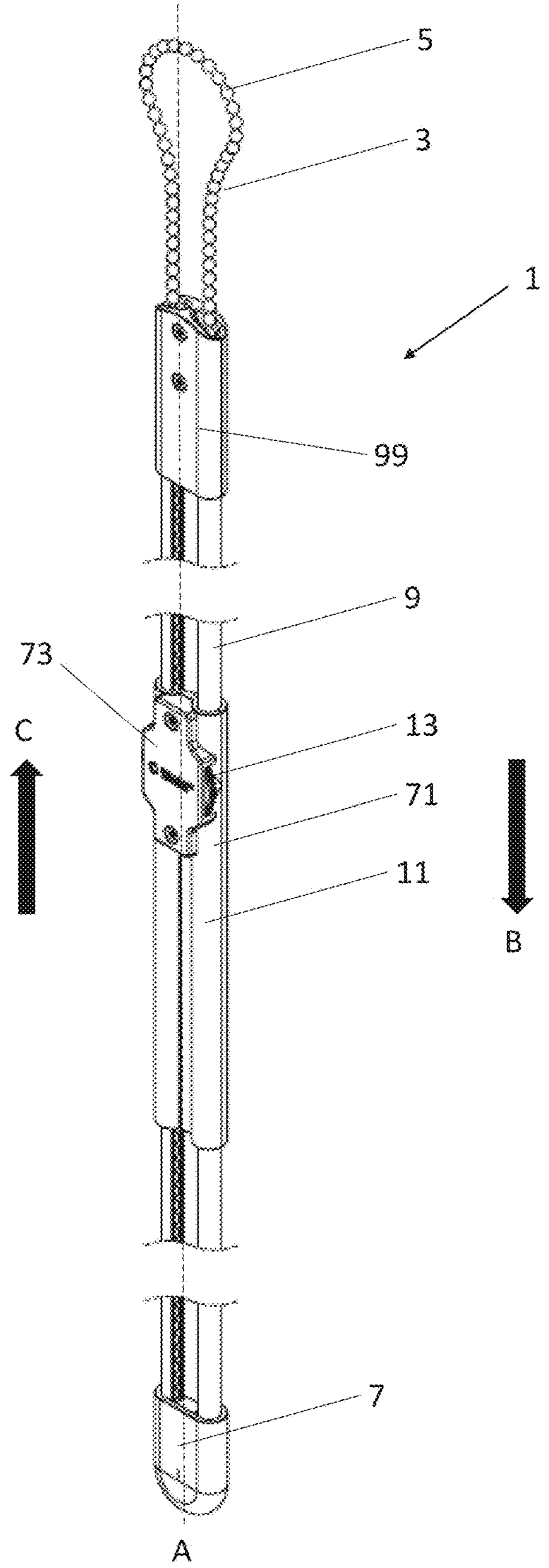
FIG. 1 provides a perspective view of the chain operation system according to the present disclosure.

Disclosed herein is a chain operation system for a chain driven blind assembly. FIG. 1 shows a perspective view of the chain operation system 1. The dotted lines in FIG. 1 represent that the chain operation system could be of any length suitable for a particular application. The blind assembly (not shown) includes a beaded chain loop 3 that is operably connected to a drive means of the assembly to retract and extend a blind. The beaded chain loop 3 typically comprises a plurality of connected beads (e.g. round metal or plastic beads) that are connected at either end to form a continuous loop of beads.

In a typical form, the blind assembly includes an elongate rod for supporting a blind (e.g. a length of fabric). First and second ends of the rod are typically configured to support the blind assembly (e.g. on either side of a window). The drive means is typically connected to the rod and is configured to rotate the rod about a longitudinal axis of the rod to extend and retract the blind in use. The chain loop extends along a longitudinal axis of the chain loop (typically this axis is substantially perpendicular to the longitudinal axis of the rod) between proximal 5 and distal 7 ends of chain loop. The proximal end of the chain is able to be connected to the drive means of the blind assembly such that a user is able to operate the chain to operate retract and extend the blind.

The assembly disclosed herein generally consists of an optional top guide, an optional bottom guide, a wand, a looped bead chain and a handle configured to operate the looped bead chain. The looped bead chain is connected to the blind clutch (drive) assembly (not shown). The clutch has a teethed wheel that matches the pitch of the bead chain. Downward motion of the handle disclosed herein results in motion of the chain, which in turn rotates the drive to move the blind. Upward motion of the handle disclosed herein does not engage the chain, resulting in no blind movement.

Advantageously, the disclosed retrofit child safety device addresses one or more of the problems associated with existing retrofit solutions, and is low cost, easy to use and compact. It can be attached to blinds fitted with a looped bead chain operated clutch. The disclosed system used in this retrofit device can also be applied to dedicated looped bead chain operated systems.

The chain operation system 1 includes a guide member, in the form of a wand 9, that is configured to guide the chain loop 3. The wand 9 extends along a longitudinal axis A of the wand 9. The system 1 also includes a handle 11 slidably mounted to the wand 9 to enable the handle 11 to be slid along the longitudinal axis A of the wand 9 in a first direction B (a downward stroke in the detailed embodiment) to engage the chain loop 3, and second direction C (an upward stroke in the detailed embodiment) to disengage the chain loop 3. The handle 11 includes a switching member 13 that is operable by a user and configured to rotate an internal mechanism (detailed below) to switch between the first and second chain positions.

Figure 2:
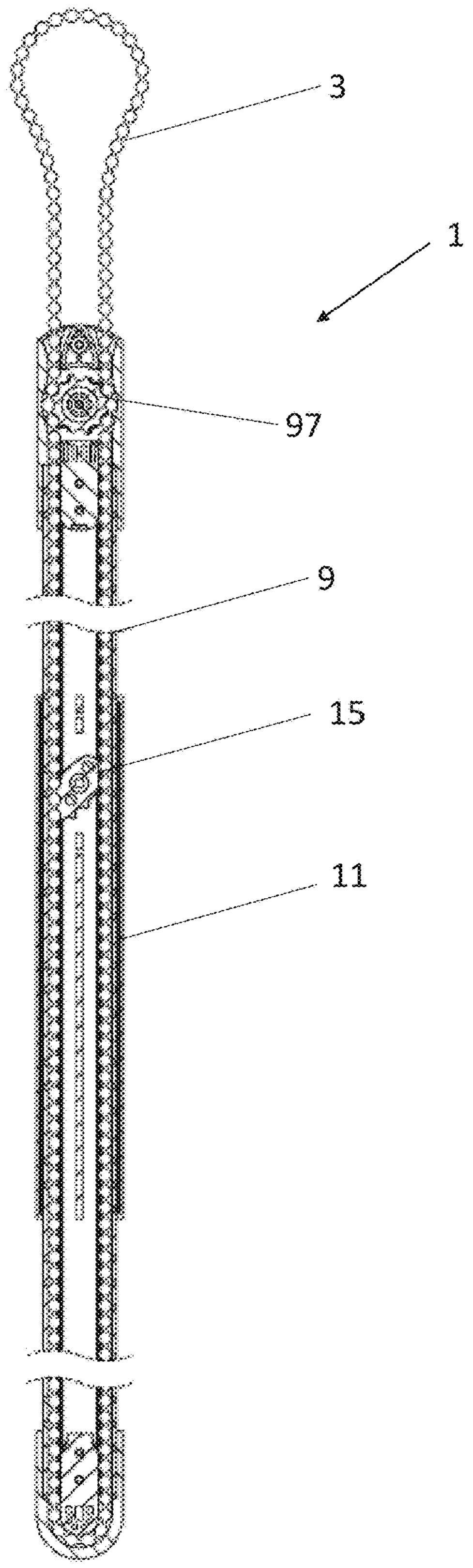
FIG. 2 provides a cross sectional view through the chain operation system of FIG. 1.

FIG. 2 provides a cross sectional view through the chain operation system 1. The handle 11 includes a chain driver, in the form of a pawl 15, mounted to the handle 11 which is selectively rotatable between a first position and a second position. Together the switching member and pawl form a direction selector. A user can select the direction of operation, i.e. open or close a blind via a selector switch (button, knob, wheel, lever). Advantageously, there is no need to press and hold specific parts of the handle to select and maintain the desired direction. Optionally, the selector wheel is configurable to show the correct blind direction depending on the blind layout (e.g. left hand vs right hand control, and front roll vs reverse roll).

Advantageously, the user does not need to simultaneously apply hand/finger pressure to grab the bead chain and apply a pull-down force on the handle to operate the blind. During the downstroke, the pawl 15 automatically grabs the correct side of the bead chain for the desired blind direction. Also, there is no need to release any part of the handle or to perform any hand/finger maneuvers to release the bead chain in the upstroke.

Figure 3:
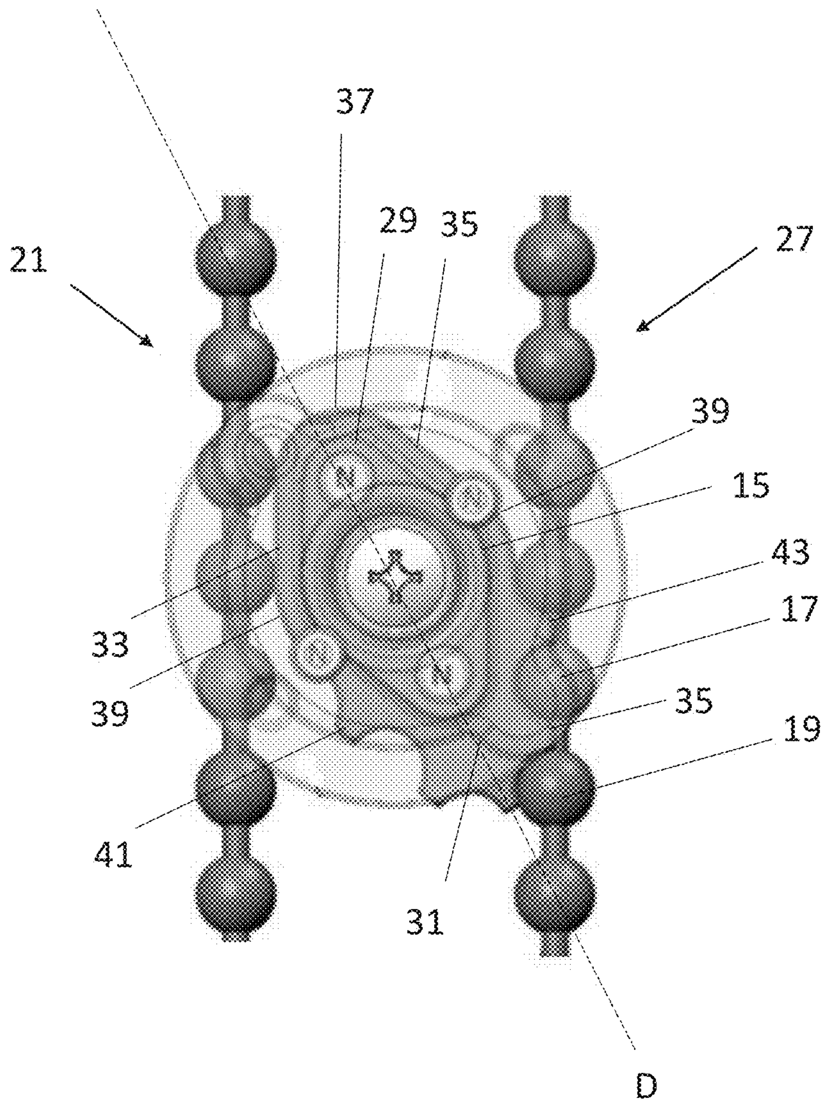
FIG. 3 provides a front view of a pawl of the chain operation system of FIG. 1 when in the first position.
Figure 4A:
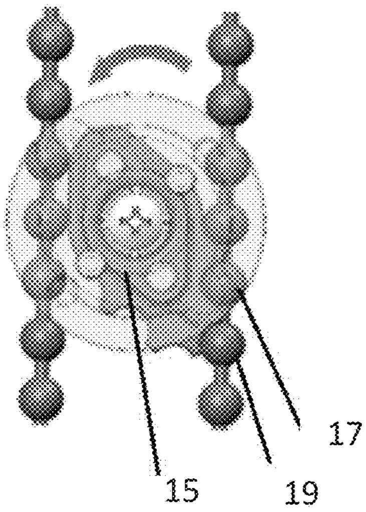
FIGS. 4*a-e* provide front views of the pawl shown in FIG. 3 in multiple positions between the first position (*a-d*) and the second position (*e*)

The configuration and operation of the pawl 15 will be discussed further below with reference to FIGS. 3 and 4. FIGS. 3 and 4*a* provides a front view of the pawl 15 when in the first position. In this first position, the pawl 15 drivingly engages two beads 17, 19 on a second side (right hand side) 27 of the chain loop to extend (or retract) the blind assembly. In the second position (shown in FIG. 4*e*), the pawl 15 drivingly engages two beads 23, 25 on the first side (left hand side) 21 of the chain loop to retract (or extend) the blind assembly.

The pawl 15 is configured such that when the pawl 15 is in the first position, the chain driver disengages the first side 21 of the chain loop to allow the first side 21 of the chain loop to pass the pawl 15. The pawl 15 is configured such that when the pawl 15 is in the second position, the pawl 15 disengages the second side 27 of the chain loop to allow the second side 27 of the chain loop to pass the pawl 15.

The configuration of the pawl 15 will now be discussed in further detail with respect to FIG. 3. The pawl 15 includes a body portion 29 and a driver portion 31 extending from the body portion 29. The body portion 29 extends along a longitudinal axis D of the pawl 15. The body portion 29 includes a first release side surface 33 offset from the longitudinal axis D of the pawl 15 and forming an acute angle with the longitudinal axis D of the pawl. The body portion 29 also includes a second release side surface 35 offset from the longitudinal axis D of the pawl 15 and forming an acute angle with the longitudinal axis D of the pawl 15. The body portion 29 includes a nose portion 37 disposed between, and connecting, the first 33 and second 35 release side surfaces. The first 33 and second 35 release side surfaces of the body portion 29 of the pawl 15 are substantially flat, and the nose portion 37 is rounded. In profile, the first 33 and second 35 release side surfaces and the nose portion 37 together form a blunt triangular shape with hips 39. This shape allows for the chain loop to pass smoothly across and past the body portion 29 when it is positioned against the chain loop in the first or second positions, and does not engage the chain loop during the upstroke of the handle.

When the pawl 15 is in the first position (FIGS. 3 and 4*a*), the first release side wall 33 of the pawl 15 extends substantially parallel to the first side 21 of the chain loop to allow the pawl 15 to disengage the first side 21 of the chain loop when the handle is slid in the first direction (downward stroke as shown by ‘B’ in FIG. 1). When the pawl 15 is in the second position (FIG. 4*c*), the second release side wall 35 of the pawl 15 extends substantially parallel to the second side 27 of the chain loop to allow the pawl 15 to disengage the second side 27 of the chain loop when the handle is slid in the first direction (downward stroke as shown by ‘B’ in FIG. 1).

The driver portion 31 extends along the longitudinal axis D of the pawl 15, and includes a first engagement side surface 41 offset from the longitudinal axis D of the pawl 15 and forming an acute angle with the longitudinal axis D of the pawl 15, and a second engagement side surface 43 offset from the longitudinal axis D of the pawl 15 and forming an acute angle with the longitudinal axis D of the pawl 15.

When the pawl 15 is in the first position (FIGS. 3 and 4*a*), the second engagement side wall 43 of the pawl 15 extends substantially parallel to the second side 27 of the chain loop to allow the pawl 15 to engage the second side 27 of the chain loop when the handle is slid in the first direction (downward stroke as shown by ‘B’ in FIG. 1). When the pawl 15 is in the second position (FIG. 4*c*), the first engagement side wall 41 of the pawl 15 extends substantially parallel to the first side 21 of the chain loop to allow the pawl 15 to engage the first side 21 of the chain loop when the handle is slid in the first direction (downward stroke as shown by ‘B’ in FIG. 1).

The pawl 15 grabs the chain by jamming at least one bead chain against the extrusion (the wand 9). The resultant forces acting on the bead have vectorial components against the extrusion surface and in the direction of the desired motion. In principle, jamming an object against a stationary surface will result in high friction and restricted mobility. The Applicant’s testing has shown that the friction between the extrusion and bead is minimal, and common powder coatings and anodized finishes on aluminium help with further reducing the friction. Also, a thin liner or tape of low friction material, such as PTFE or UHMWPE, located between the extrusion and bead, can be applied to further reduce friction and still maintain a compact assembly.

As will be apparent to the skilled addressee, an alternative approach is to grab the bead chain without touching the stationary surface, or by minimising contact with the extrusion. This can be achieved by placing the grabbing mechanism within the C-shape cavity, but requires more space, thus adding bulk to the assembly, and therefore while it is operational, is not the preferred approach.

The pawl functionality disclosed herein refers in general to engaging only one part of the chain. As will be evident to the skilled addressee, the number of pawls required is determined by the shape of the extrusion and orientation of the openings.

Figure 5:
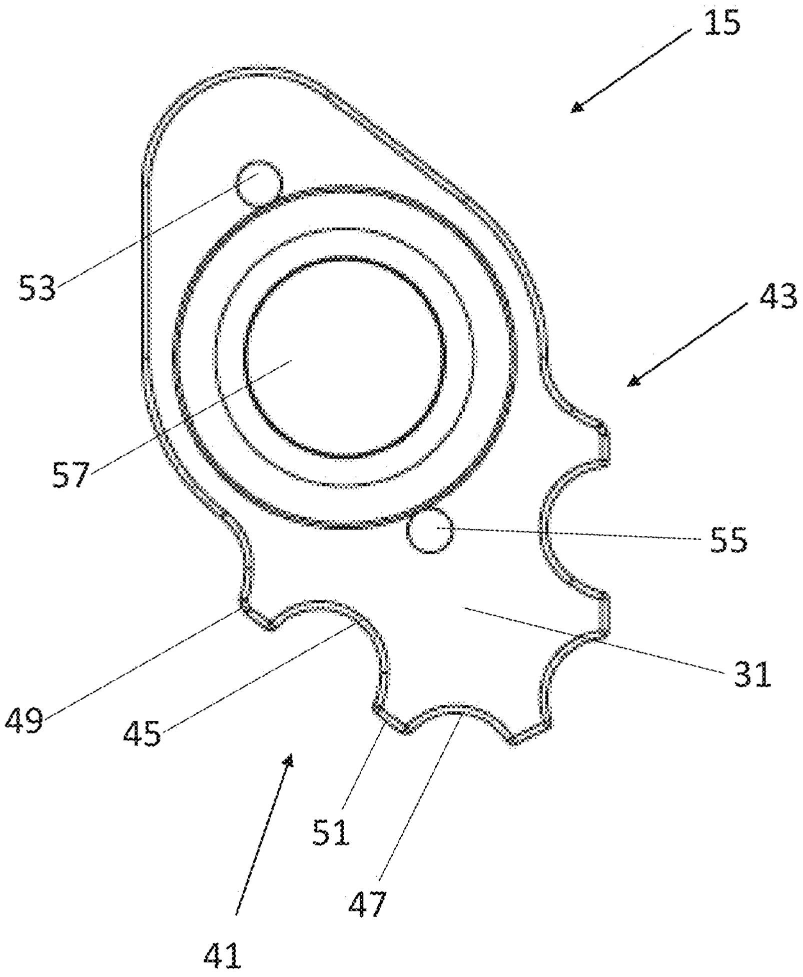
FIG. 5 provides a rear view of the pawl shown in FIG. 3.

The driver portion 31 of the pawl 15 will now be described with reference to FIG. 5, which provides a rear view of the pawl 15. The first engagement side wall 41 of the pawl 15 includes at least one receiving portion 45 configured to engage and retain the first side of the chain loop. In the detailed embodiment, the first engagement side wall 41 of the pawl 15 includes two side-by-side receiving portions 45, 47. This arrangement enables secure engagement of the pawl 15 with the beaded chain. As will be evident to the skilled addressee, one or more receiving portions could be used to suit, for example, the dimensions of the system and chain.

The receiving portions 45, 47 of the first engagement side wall 41 correspond in profile with a bead of the chain loop (curved to match the profile of a single bead). The first engagement side wall 41 of the pawl 15 includes first 49 and second 51 locking portions disposed on either side of receiving portion 45. The first 49 and second 51 locking portions are each configured to be positioned between adjacent beads of the chain loop.

In the detailed embodiment, the profile of the second engagement side wall 43 of the pawl 15 is a mirror image of the first side wall 41 and operates in the same manner to engage beads disposed on the second side of the chain loop.

The body portion 29 and driver portion 31 of the pawl 15 each include a magnet configured to selectively rotate the pawl 15 between the first and second positions, as will be discussed in further detail below. The pawl 15 includes an aperture 57 formed therethrough and a shaft (e.g. a peg), the aperture being configured to receive the shaft to mount the pawl 15 to the handle 11. The shaft may form part of the first or second cover portions of the handle 11 (discussed in further detail below).

Moving the blind to the desired position may require several strokes of the handle. A stroke has a downstroke and an upstroke. In the detailed embodiment, motion of the blind only happens during the downstroke, purposely to maximise a person’s mechanical advantage. The blind does not move during the upstroke but is required to complete the full stroke. Pulling down the handle drives the right hand side 27 of the chain, while the left hand side 21 of the chain is free to move, and by default it will move in the opposite direction, due to the chain being a closed loop. Pushing up the handle (upstroke) will disengage the pawl from the bead chain and allow the handle to reset for the next downstroke. During a full stroke the pawl can move between an engaged and a neutral position.

The geometric layout of the pawl and beads ensures that beads jam between the pawl and extrusion, ensuring a secure engagement without any risks of dislodgement (unless intended e.g. during the upstroke). Yet, the pawl can still impart a downward force on the beads to push the chain downward. In the embodiment shown in FIG. 3, one symmetrical pawl is located in between the bead chain. The pawl can engage either side of the chain. An alternative embodiment may use two central asymmetric pawls one above each other, each facing the correct side of the bead chain, and operated independently or simultaneously to selectively engage or disengage the looped bead chain.

Similarly, an alternative embodiment may use two pawls located on the right hand side and left hand side of the looped bead chain. This allows for the gap between the looped bead chain to be significantly reduced. As will be evident to the skilled addressee, the pawls can be symmetrical or asymmetrical, and pawls can be operated independently or simultaneously to selectively engage or disengage the looped bead chain.

When the handle is slid in the second direction (upward stroke as shown by 'C' in FIG. 1), the first 41 and second 43 engagement side surfaces of the pawl 15 disengage the first and second sides of the chain loop to allow the handle to move freely relative to the chain loop. In other words, during an upward stroke of the handle, the curved profile of the engagement side causes disengagement from both the first and second sides of the chain loop such that the longitudinal axis of the pawl is positioned substantially parallel to the first and second chain loop and is able to move freely upwardly relative to the chain loop.

Figure 6:
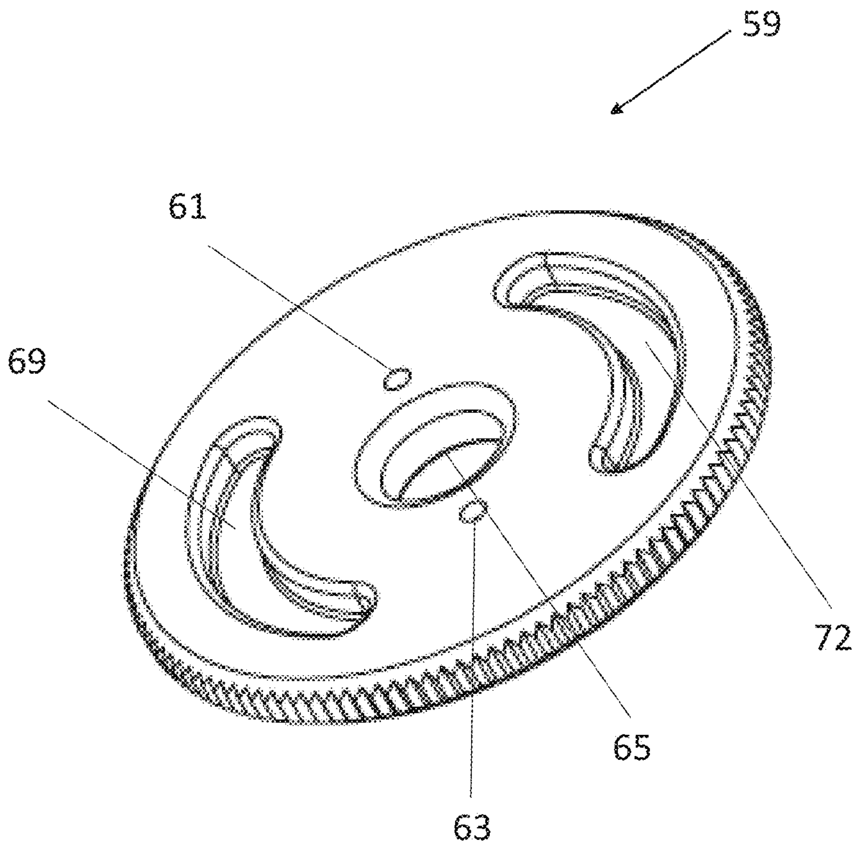
FIG. 6 provides a perspective view of a wheel of the chain operation system of FIG. 1.

The switching member 13 of the handle 11 includes a wheel 59 that is disposed adjacent the pawl 15. The wheel 59 will be discussed with reference to FIG. 6, which provides a perspective rear view of the wheel 59. Like the pawl 15, the wheel includes two magnets (positioned behind the push out holes 61, 63 shown in FIG. 6) configured to selectively rotate the pawl 15 between the first and second positions upon rotation of the wheel 59. The two magnets of the wheel 59 are evenly spaced and, with the magnets of the pawl 15 (the magnets of the pawl 15 are positioned behind the push out holes 53, 55 shown in FIG. 5), are configured to selectively rotate the pawl 15 between the first and second positions upon rotation of the wheel 59. Like the pawl 15, the wheel 59 includes an aperture 65 formed therethrough configured to receive the shaft to mount the wheel to the pawl 15 and the handle 11. In the detailed embodiment, the pawl 15 and wheel 59 are mounted to the handle 11 through the same shaft around which each component rotates (via the user for the wheel 59 and via the magnets/motion for the pawl 15).

Functionally, the magnets of the selector switch and pawl provide a spring mechanism with two key functions. The first is to allow the pawl to auto-engage the bead chain in one direction and auto-disengage the bead chain in the opposite direction, i.e. a one-way bead chain self-latching mechanism. Secondly, the mechanism incorporates a switch (button, know, wheel, lever, etc) to toggle the pawl between one part of the bead and the other to selectively change direction of blind movement. As will be evident to the skilled addressee, there are several methods by which the disclosed function could be achieved. The disclosure is not limited to the use of magnets to achieve this functionality. For example, the toggle and self-latching functions can be achieved with mechanical springs. The use of magnets is beneficial due to simplicity and compactness of the mechanism. However, a mechanical spring version can also be utilised with the use of a wire forms, flat springs, torsion springs, extension springs, compression springs, or rubberised materials that have spring-like properties. In one embodiment, a traditional toggle mechanism can be realised using compression springs and a hinged linkage. In another embodiment, the mechanism includes a bi-stable spring mechanism, with one end fixed to the pawl and the other end pivoting about a fixed point. The spring may be arranged in such a way that it is partially compressed (bent) in two equilibrium states. The toggle functionality may be realised with the selector switch to change between equilibrium states.

In the detailed embodiment, the spring-like and toggle effect is achieved by orienting one or more magnets in each component against same magnetic poles (i.e. N-N or S-S). The magnet(s) are embedded in each component (wheel & pawl) so that these are always wanting to repel each other. Arranging opposing components with the same polarity, so that these repel each other, significantly simplifies the complexity of the mechanism. In another embodiment, the magnets in each component can be oriented to attract each other (i.e. N-S, or S-N) to achieve the same functionality. Using magnet arrangements that attract each other has advantages. With the correct layout, this arrangement provides the maximum attraction force on the pawl 15 to engage the beads during the downstroke. Also, during the upstroke, the magnets are forced apart, thus reducing the attraction force, which reduces the ratcheting noise. This embodiment provides more positive bead engagement, but it adds complexity to the mechanism. In the detailed embodiment, the magnets are cylindrical in shape with poles located on the flat surfaces of the cylinder. While cylindrical/disk magnets are a preferred shape for this application, other shapes could also be used.

In the position shown in FIG. 3, the wheel is wanting to rotate clockwise and the pawl is wanting to rotate anti-clockwise (i.e. both are repelling each other). Both have physical stops (or detents) so that rotation is only possible towards the symmetry line of the assembly. The physical stop for the pawl is the bead chain (i.e. always engaged). In the absence of a bead chain, the extrusion provides a physical stop for the pawl. The physical stop of the wheel is a slot located on the handle (discussed below), or can be on a separate component that is part of the handle. This physical stop for the wheel can take many forms, so the curved slot discussed below is one of many options.

Figure 4B:
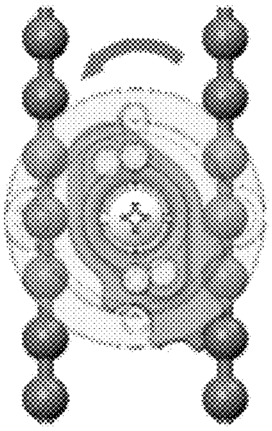
Figure 4C:
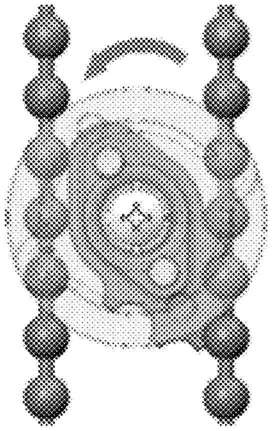
Figure 4D:
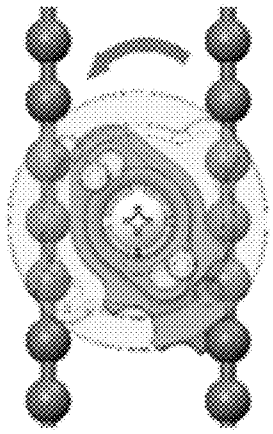
Figure 4E:
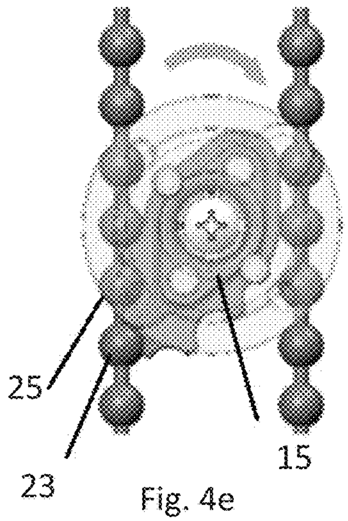

FIG. 4*a-e* show the toggle mechanism moving from the first position (4*a*) to the second position (4*e*). In FIG. 4*a*, the pawl is already engaged to the right-hand side of the looped bead chain. Pulling down on the handle results in the right hand side 27 chain moving downwards. Meanwhile, the left hand side 21 of the chain is not engaged and glides upwards past the pawl. To change direction of blind operation, the selector wheel is rotated counter-clockwise until its magnets go past the magnets in the pawl (FIGS. 4*a* to 4*c*). As the magnets approach each other, the repelling force increases exponentially. As soon as the magnets go past each other (FIG. 4*d*), the pawl toggles clockwise as it repels the wheel magnets, thus the pawl engages the left hand side 21 of the chain (FIG. 4*e*), effectively changing direction of blind operation. In the detailed embodiment, the selector wheel magnets are deliberately located slightly off-centre relative to the pawl magnets to effect the toggle function. The detailed embodiment shows the selector wheel and pawl with 2 magnets each (either the top pair or bottom pair are optional). One or several magnets can be used, as required, to increase the repelling force. Due to the small size of the pawl in the detailed embodiment, two magnets are used to increase the repelling force. As will be evident to the skilled addressee, if space is not an issue, one larger magnet may suffice.

In the detailed embodiment, the wheel 59 includes a first slot 69 disposed on a first side of the wheel, and an optional second slot 72 disposed on a second side of the wheel 59. The handle 11 includes first 71 and second 73 cover portions (see FIG. 1). The first cover portion 71 is slidably mounted to the guide 9. The second cover portion 73 is mounted to the first cover portion 71.

Figure 7:
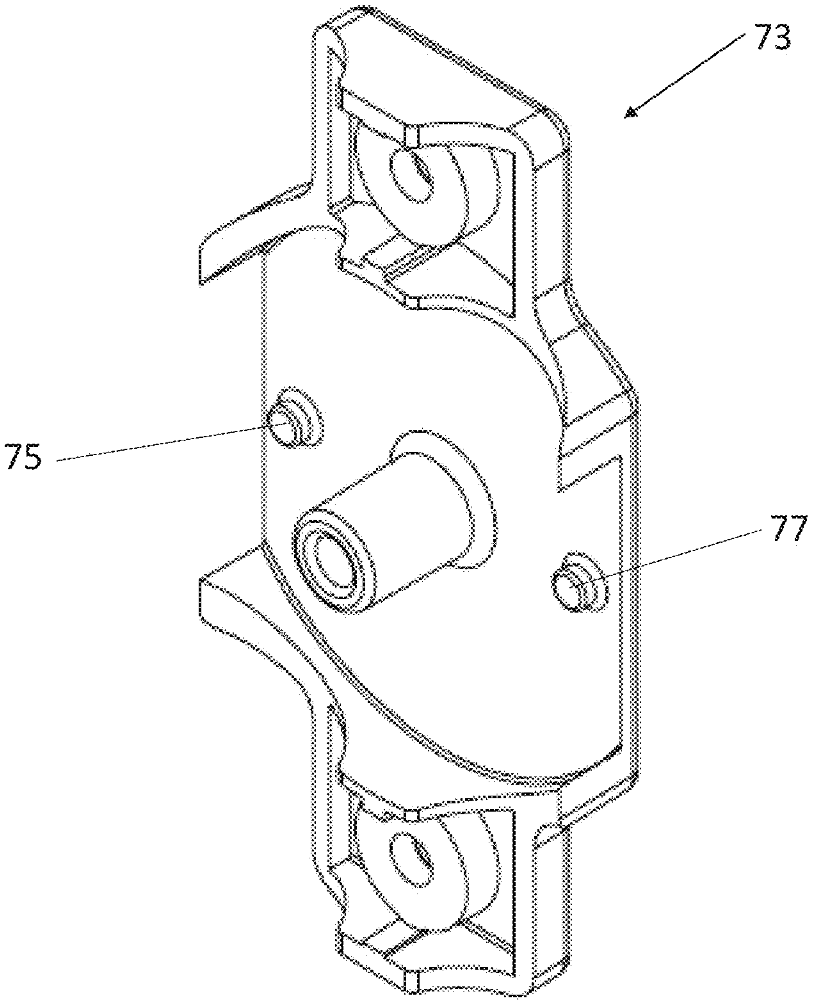
FIG. 7 provides a perspective view of an underside of a cover portion of the chain operation system of FIG. 1.

The second cover portion 73 will be described in further detail with respect to FIG. 7, which provides a perspective view of the underside of the cover portion 73. The second cover portion 73 includes first 75 and second 77 spaced projections. The first 75 and second spaced 77 projections are configured to be received in the first 69 and second 72 slots of the wheel 59 respectively to limit rotation of the wheel.

Figure 8A:
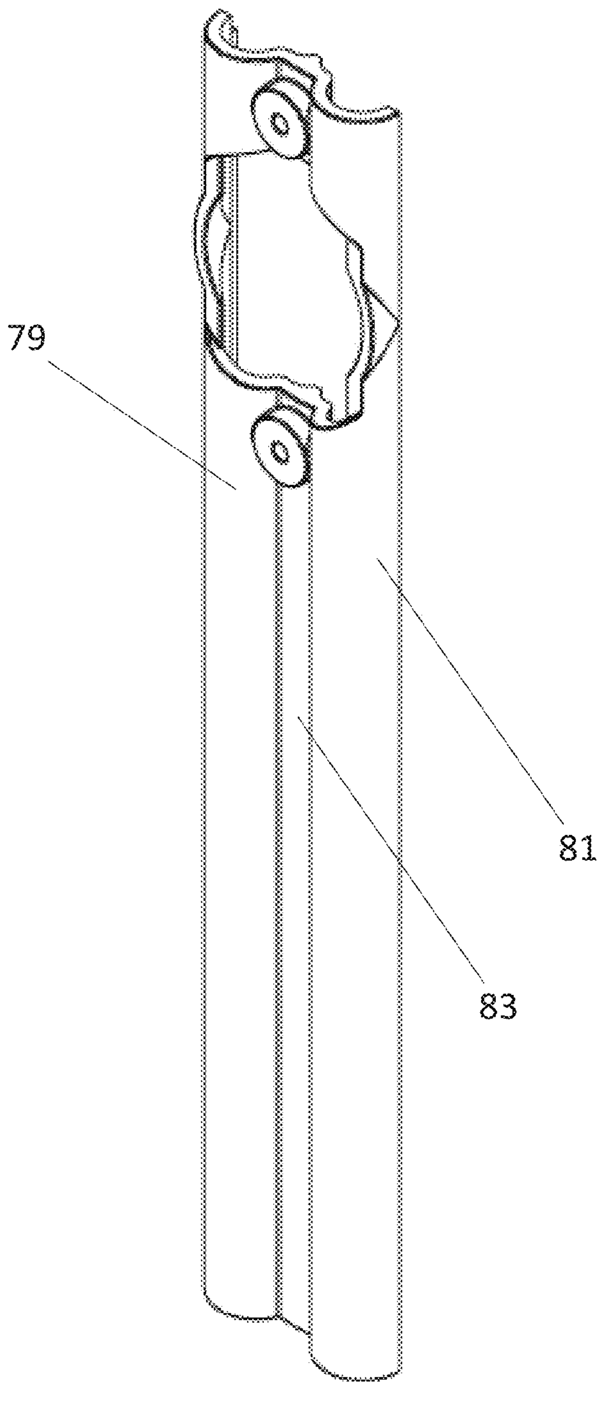
FIGS. 8*a-b* provide a perspective view of top (a) and bottom (b) halves of the first cover portion of the chain operation system of FIG. 1.
Figure 8B:
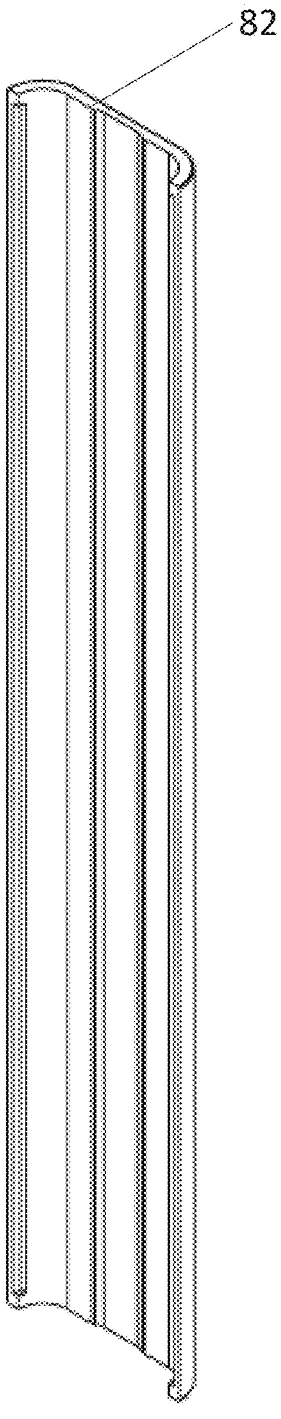

The first cover portion 71 of the handle 11 will now be described with reference to FIGS. 8*a*-*b*, which provide perspective views of top and bottom halves of the first cover portion 71. The first cover portion 71 includes a first side wall 79 extending along a first side of the handle 11 and a second side wall 81 extending along a second side of the handle 11. The first 79 and second 81 side walls are curved in profile to receive first and second side walls of the guide member 9. In the detailed embodiment, the first cover portion 71 includes two sections (front and back) that are joined together for case of manufacture. Alternatively, the first cover portion 71 can be manufactured as a single piece. The back wall 82 of the first cover portion 71 is substantially flat in profile. The first cover portion 71 of the handle includes a front wall 83 that is spaced from the back wall 82, the front wall 83 being substantially flat in profile and positioned between the first 79 and second 81 side walls of the handle 11. The first 79, second 81, front 83 and back 82 walls of the first cover portion 71 are connected to inhibit rotation of the handle 11 relative to the guide member 9 (i.e. motion of the handle 11 is restricted to linear sliding motion up and down the guide member 9). Together, the first 79, second 81, front 83 and back 82 walls of the first cover portion 71 define a cavity that is configured to receive the guide member 9. In another embodiment, the first 79 and second 81 side walls could also be tangential to the front wall 83.

Figure 9:
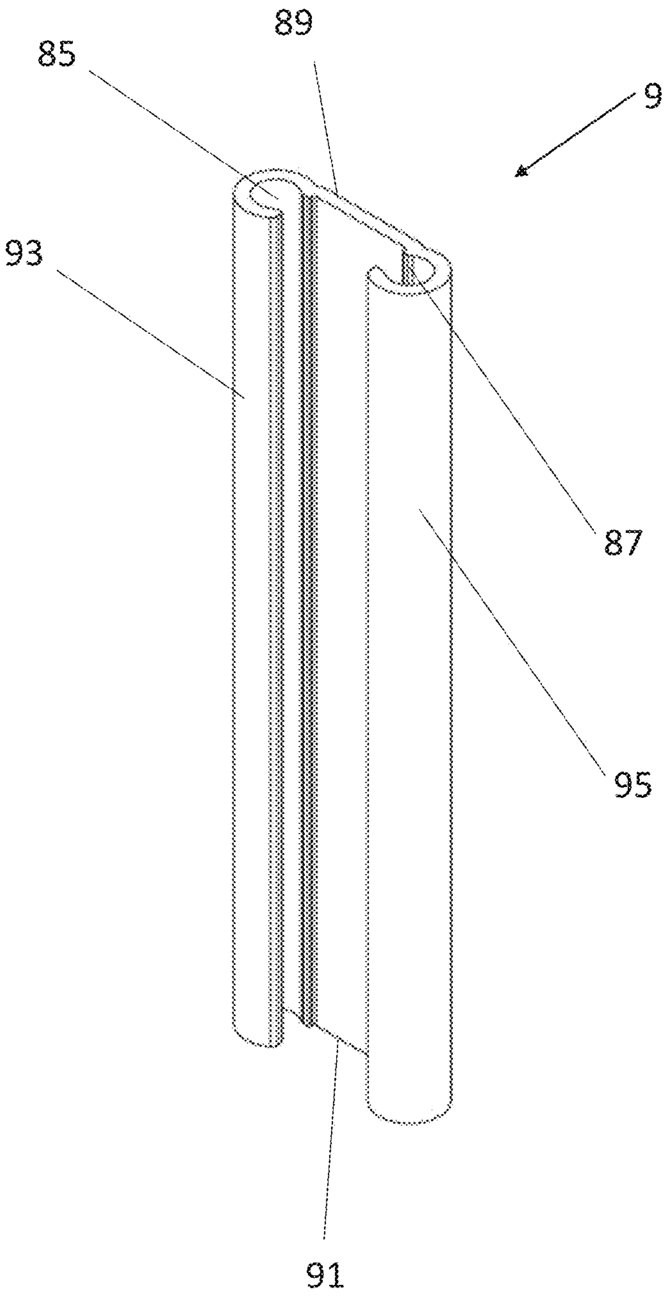
FIG. 9 provides a perspective view of the wand of the chain operation system of FIG. 1.

The wand 9 will now be described with reference to FIG. 9, which provides a perspective view of the wand 9. The wand 9 includes a first channel 85 for guiding a first side of the chain loop, and a second channel 87 for guiding a second side of the chain loop. The wand 9 includes a first end 89 disposed adjacent the chain driven blind assembly and a second end 91 disposed away from the chain driven blind assembly. When the handle 11 slides in the first direction (downward stroke as shown by 'B' in FIG. 1) it moves towards the second end 91 of the wand 9, and when the handle 11 slides in the second direction (upward stroke as shown by 'C' in FIG. 1), it moves towards the first end 89 of the wand 9.

The first 85 and second 87 channels of the wand 9 are spaced from each other correspond with the profile of the beads of the chain loop. The first 85 and second 87 channels each comprise a C-shaped curved wall 93, 95 that surrounds the respective channel. The curved walls 93, 95 that surround the first and second channels are C-shaped to correspond with the profile of the beads of the chain loop and to retain the chain loop in the wand 9. An opening in the curved wall 93 that surrounds the first channel 85 faces an opening in the curved wall 95 that surrounds the second channel 87 such that the chain loop is retained within the guide member in use. The shape of the curved walls allows a beaded chain to be snap fitted to the wand 9 such that it is then able to freely translate within the wand 9, but is not accessible by a user (as is discussed further below). As will be evident to the skilled addressee, it is not essential for the first 85 and second 87 channels to be internally curved. A rectangular, triangular, or D-shaped channel of the correct internal dimensions will serve the same purpose. However, curved channels offer the most compact and aesthetic embodiment.

For a looped chain application, two channels are required which can be connected in various configurations to form the main extrusion profile. For the embodiment described herein, the configuration with openings facing inwards provides a particularly compact solution. The space in between the chain is fully utilised to place the mechanism to engage the bead chain. It should be noted that having a compact assembly the normal plane through the looped chain is typically more important than in the parallel plane through the looped chain, as this dimension relates to system deduction. As will be evident to the skilled addressee, in another embodiment, the wand could include C-shaped channels having openings that face outwardly. In such an embodiment, two pawls would be required to interact with the chain loop (as the chain is effectively protected from the inner space of the wand within which the pawl of the disclosed arrangement is positioned).

Again, the bead chain is housed inside the C-shape walls in an extrusion (the wand 9). The opening of the curved walls is small enough to retain the bead chain within the cavity, making it fully finger inaccessible, yet allowing for easy insertion of the bead chain during assembly manufacture. The gap also allows access to the bead chain for grab-release operations. In the detailed embodiment, the implementation of two C-shape cavities with opening that face each other is particularly advantageous. This allows for a single pawl to access either side of the looped bead chain, advantageously making it a very compact assembly.

Figure 10:
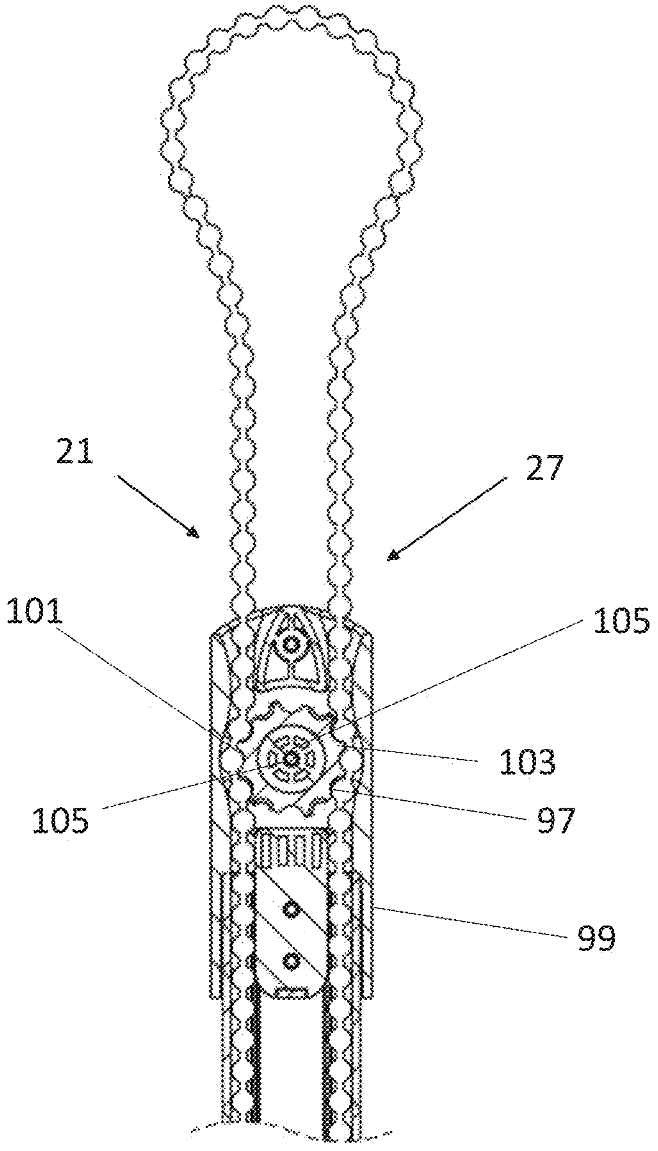
FIG. 10 provides cross sectional view through a funnel member of the chain operation system of FIG. 1.
Figures 11A, 11B:
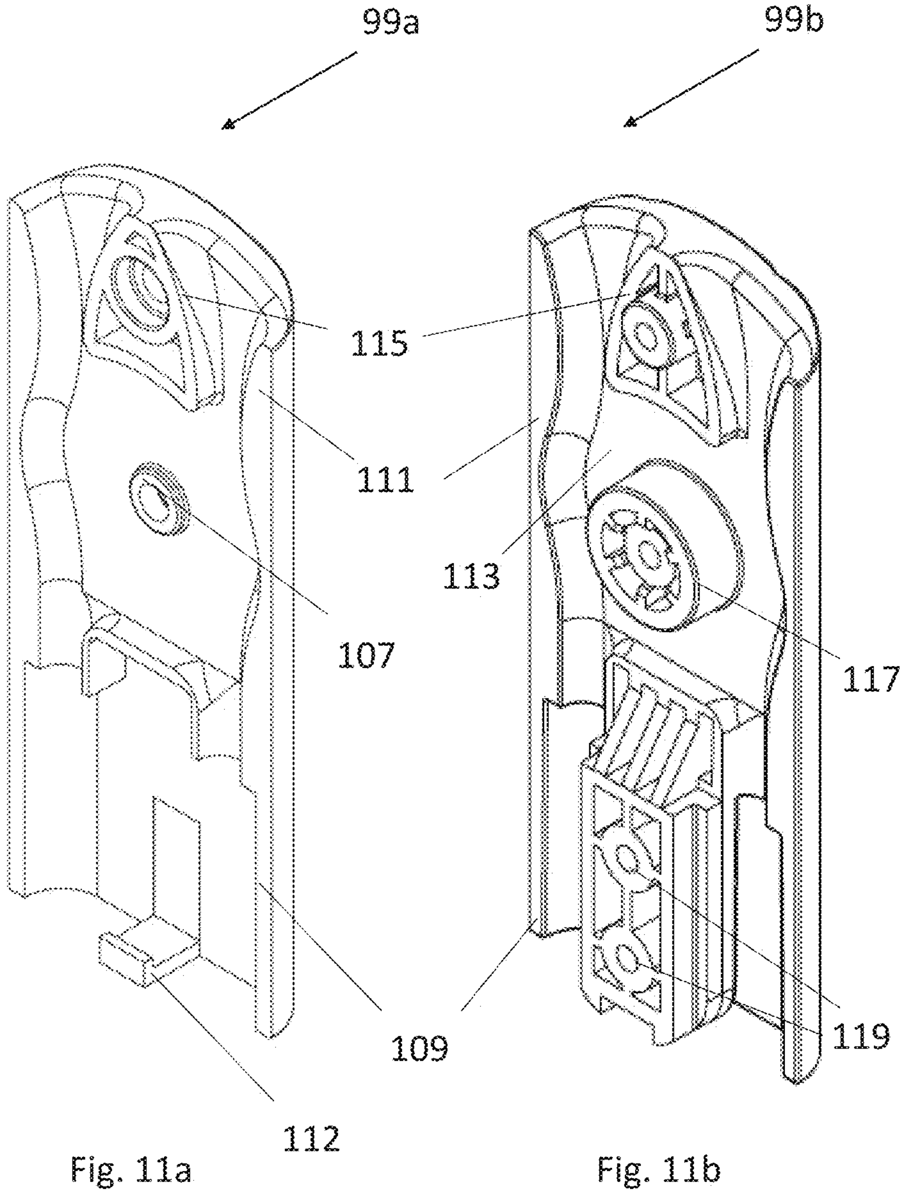
FIGS. 11*a-b* provide perspective views of the top (a) and bottom (b) halves of the funnel member shown in FIG. 10.

As is shown in FIG. 2, the detailed embodiment includes an optional rotatable member 97 mounted within a funnel member 99 (shown in FIG. 1) that is mounted to a first end of the wand 9. The rotatable member 97 is configured to receive the chain loop of the blind assembly. The rotatable member 97 and funnel member 99 will be described in further detail with respect to FIGS. 10 and 11. FIG. 10 provides cross sectional view through the funnel member 99. FIGS. 11*a*-*b* provide perspective views of the top 99*a* and bottom 99*b* halves of the funnel member 99. The chain loop engages first 101 and second 103 opposing sides of the rotatable member 97. The chain loop extends from the first side 101 of the rotatable member 97 and returns to engage the second side 103 of the rotatable member 97.

The rotatable member 97 is mounted in a fixed position within the funnel member 99. The rotatable member 97 includes a first aperture 105 formed therethrough. The bottom half of the funnel member 99*b* includes a seat 117 circular in profile with second apertures 107 formed therethrough on 99*a* & 99*b*. The first 105 and second 107 apertures are disposed along an axis of rotation of the rotatable member 97. A fastener (not shown) extends through the second 107 apertures and thereby rotatably mounts the rotatable member 97 to the funnel member 99.

The funnel member 99 includes an extension portion 109 having a cross sectional area that is greater than a cross sectional area of the wand 9. The wand 9 is configured to be received by the extension portion 109 to mount the funnel member 99 to the wand 9 (i.e. the extension portion 109 is sized to fit over the end of the wand 9). In the detailed embodiment, the top half 99*a* of the extension portion 109 includes a projection 112 disposed towards the bottom of the extension portion 109 to snap fit the top half 99*a* of the funnel member to the bottom half 99*b* of the funnel member.

The funnel member 99 includes a head portion 111 that is disposed at an end of the extension portion 109. In the detailed embodiment, extension portion 109 is integrally formed with the head portion 111. The head portion 111 is configured to extend from the wand 9. The head portion 111 and extension portion 109 comprise a channel 113 formed therethrough that is configured to receive the chain loop. The head portion 111 is open at a first end of the head portion such that the channel 113 of the head portion is able to receive the chain loop from the extension portion 109, and is open at a second end of the head portion 111 such that the chain loop extends from head portion 111 and towards the drive means of the blind assembly. The head portion 111 includes a chain guide 115 disposed centrally in the channel, the chain guide 115 extending along the longitudinal axis of the funnel member 99 and configured to guide the chain loop towards and away from the rotatable member 97. The head portion includes a seat 117 configured to support the rotatable member 97. The seat 117 is circular in profile. One or more fasteners extend through the extension portion 109 (through apertures 119) and mount the funnel member 99 to the wand 99. The guide 115 and seat 117 include fastener bosses to secure the top 99*a* portion of the funnel member to the bottom 99*b* portion of the funnel member.

Figure 12A:
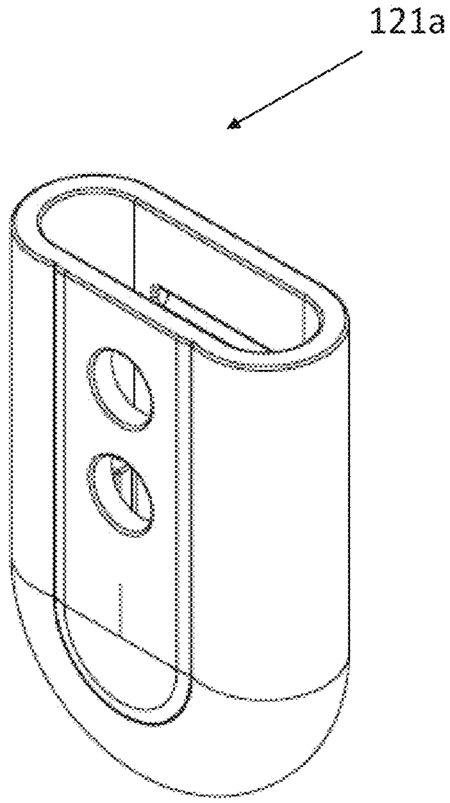
FIGS. 12*a-b* provide perspective views of the two components of the bottom guide portion of the chain operation system of FIG. 1.
Figure 12B:
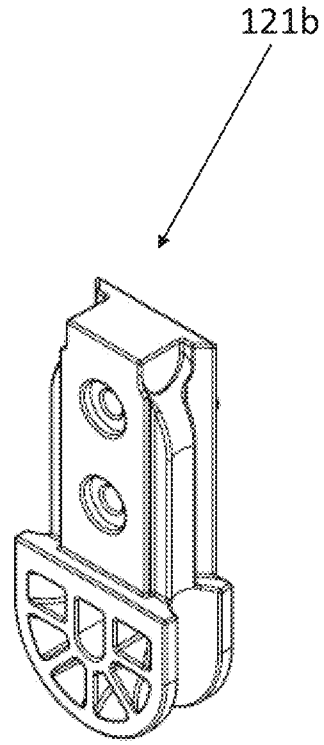

In the detailed embodiment, the system 1 includes an optional bottom guide portion 121. The bottom guide portion 121 is shown in FIGS. 12*a-b*, which provide perspective views of the two components 121*a-b* of the bottom guide portion. The outer component 121*a* of the guide portion is positioned at the bottom of the wand 9 to cover the bottom of the wand 9 (and therefore the loop of chain at the bottom of the wand). The profile of the outer component 121*a* of the guide portion allow for it to fit over the wand 9. The guide cover can have multiple purposes. It can hide the exposed bead chain and may also be made from a resilient material to assist with impact suppression if the device is allowed to swing freely in a pendulum motion and impact a wall or window.

The inner component 121*b* of the guide portion is also positioned at the bottom of the wand 9, and fits inside the outer component 121*b*. It includes a guide channel to guide the chain loop at the bottom of the wand 9, and has a profile that enables it to fit within the recess formed between the channels of the wand 9. The inner component allows the bead chain to loop back and glide freely. The inner diverter may be a single piece (as shown) or incorporate a freewheeling pulley (not shown).

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

What is claimed is:

1. A chain operation system for a chain driven blind assembly, the system comprising;

a guide member configured to guide a beaded chain loop of the chain driven blind assembly, the guide member extending along a longitudinal axis of the guide member and comprising a first channel for guiding a first side of the chain loop, and a second channel for guiding a second side of the chain loop; and a handle slidably mounted to the guide member, the handle being configured to slide along the longitudinal axis of the guide member in a first direction to engage and drive the chain loop, and in a second direction to release the chain loop, the handle comprising:

a chain driver selectively rotatable between a first position, whereby a first portion of the chain driver drivingly engages one or more beads on the second side of the chain loop, and a second position, whereby a second portion of the chain driver drivingly engages one or more beads on the first side of the chain loop, the second portion being adjacent to the first portion; and a switching member operable by a user and configured to rotate the chain driver between the first and second positions.

2. The chain operation system according to claim 1, wherein the chain driver is configured such that when the chain driver is in the first position, the chain driver is free of driving engagement with the first side of the chain loop to allow the chain driver to pass the first side of the chain loop, and when the chain driver is in the second position, the chain driver is free of driving engagement with the second side of the chain loop to allow the chain driver to pass the second side of the chain loop.

3. The chain operation system according to claim 2, wherein the chain driver comprises a body portion and a driver portion extending from the body portion, the driver portion being defined by the first portion and the second portion of the chain driver, the body portion extending along a longitudinal axis of the chain driver and comprising a first release side wall offset from the longitudinal axis of the chain driver and forming an acute angle with the longitudinal axis of the chain driver, a second release side wall offset from the longitudinal axis of the chain driver and forming an acute angle with the longitudinal axis of the chain driver, and a nose portion disposed between, and connecting, the first and second release side walls.

4. The chain operation system according to claim 3, wherein the first and second release side walls of the body portion of the chain driver are substantially flat, and the nose portion of the body portion of the chain driver is rounded.

5. The chain operation system according to claim 3, wherein when the chain driver is in the first position, the first release side wall of the chain driver extends substantially parallel to the first side of the chain loop to allow the chain driver to move past the first side of the chain loop when the handle is slid in the first direction, and when the chain driver is in the second position, the second release side wall of the chain driver extends substantially parallel to the second side of the chain loop to allow the chain driver to move past the second side of the chain loop when the handle is slid in the first direction.

6. The chain operation system according to claim 3, wherein the driver portion extends along the longitudinal axis of the chain driver, the driver portion comprising a first engagement side wall offset from the longitudinal axis of the chain driver and forming an acute angle with the longitudinal axis of the chain driver, and a second engagement side wall offset from the longitudinal axis of the chain driver and forming an acute angle with the longitudinal axis of the chain driver, wherein the second engagement side wall forms part of the first portion of the chain driver and the first engagement side wall forms part of the second portion of the chain driver.

7. The chain operation system according to claim 6, wherein when the chain driver is in the first position, the second engagement side wall of the chain driver extends substantially parallel to the second side of the chain loop to allow the chain driver to drivingly engage the second side of the chain loop when the handle is slid in the first direction, and when the chain driver is in the second position, the first engagement side wall of the chain driver extends substantially parallel to the first side of the chain loop to allow the chain driver to drivingly engage the first side of the chain loop when the handle is slid in the first direction.

8. The chain operation system according to claim 7, wherein the first engagement side wall of the chain driver comprises at least one receiving portion configured to engage and retain the first side of the chain loop, the at least one receiving portion of the first engagement side wall corresponding in profile with a bead of the chain loop.

9. The chain operation system according to claim 8, wherein the first engagement side wall of the chain driver comprises first and second locking portions disposed on either side of the at least one receiving portion, the first and second locking portions each being configured to be positioned between adjacent beads of the chain loop.

10. The chain operation system according to claim 7, wherein the first engagement side wall of the chain driver comprises two receiving portions, the two receiving portions being configured to engage and retain adjacent beads of the chain loop.

11. The chain operation system according to claim 9, wherein the second engagement side wall of the chain driver comprises at least one receiving portion configured to engage and retain the second side of the chain loop, the at least one receiving portion of the second engagement side wall corresponding in profile with a bead of the chain loop.

12. The chain operation system according to claim 11, wherein the second engagement side wall of the chain driver comprises first and second locking portions disposed on either side of the at least one receiving portion, the first and second locking portions each being configured to be positioned between adjacent beads of the chain loop.

13. The chain operation system according to claim 11, wherein the second engagement side wall of the chain driver comprises two receiving portions, the two receiving portions being configured to engage and retain adjacent beads of the chain loop.

14. The chain operation system according to claim 3, wherein the body portion and driver portion of the chain driver comprise one or more magnets configured to selectively rotate the chain driver between the first and second positions.

15. The chain operation system according to claim 6, wherein when the handle is slid in the second direction, the first and second engagement side walls of the chain driver are free of driving engagement with the first and second sides of the chain loop to allow the handle to move freely relative to the chain loop.

16. The chain operation system according to claim 1, wherein the chain driver comprises an aperture formed therethrough and a shaft, the aperture being configured to receive the shaft to mount the chain driver to the handle.

17. The chain operation system according to claim 16, wherein the switching member comprises a wheel that is disposed adjacent the chain driver, the wheel comprising one or more magnets configured to selectively rotate the chain driver between the first and second positions upon rotation of the wheel, and wherein the wheel comprises an aperture formed therethrough configured to receive the shaft to mount the wheel to the chain driver and the handle.

18. The chain operation system according to claim 17, wherein the wheel comprises a first slot disposed on a first side of the wheel, and a second slot disposed on a second side of the wheel, and wherein the handle comprises first and second cover portions, the first cover portion being slidably mounted to the guide, the second cover portion being mounted to the first cover portion, the second cover portion of the handle comprising first and second spaced projections, the first and second spaced projections being configured to be received in the first and second slots of the wheel respectively to limit rotation of the wheel.

19. The chain operation system according to claim 18, wherein the first cover portion of the handle comprises a first side wall extending along a first side of the handle and a second side wall extending along a second side of the handle, the first and second side walls being curved in profile to receive first and second side walls of the guide member, and wherein the first cover portion of the handle comprises a back wall that connects the first and second side walls of the handle, the back wall being substantially flat in profile.

20. The chain operation system according to claim 19, wherein the first cover portion of the handle comprises a front wall that is spaced from the back wall, the front wall being substantially flat in profile and positioned between the first and second side walls of the handle, the first, second, front and back walls of the first cover portion being connected to inhibit rotation of the handle relative to the guide member, and wherein the first, second, front and back walls of the first cover portion define a cavity that is configured to receive the guide member.

* * * * *